(12) United States Patent
Besche et al.

(10) Patent No.: US 6,761,188 B1
(45) Date of Patent: Jul. 13, 2004

(54) FLEXIBLE HOSE LINE, IN PARTICULAR, HIGH PRESSURE HOSE LINE WHICH IS SUBJECTED TO A PRESSURIZED FORMING PROCESS

(75) Inventors: Anton Besche, Korbach (DE); Rolf Hecker, Waldeck-Freienhagen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/959,807

(22) PCT Filed: May 9, 2000

(86) PCT No.: PCT/EP00/04127

§ 371 (c)(1),
(2), (4) Date: Jan. 4, 2002

(87) PCT Pub. No.: WO00/70257

PCT Pub. Date: Nov. 23, 2000

(30) Foreign Application Priority Data

May 12, 1999  (DE) .......................................... 199 21 724

(51) Int. Cl.$^7$ ................................................ F16L 11/00
(52) U.S. Cl. ........................ 138/126; 138/109; 138/127; 138/121
(58) Field of Search ................................. 138/109, 122, 138/121, 137, 123–127; 285/202.3, 255, 256, 259, 258

(56) References Cited

U.S. PATENT DOCUMENTS

| 3,420,553 A | | 1/1969 | Poxon, et al. ............ 138/121 X |
| 4,225,158 A | * | 9/1980 | Puechavy .................... 285/47 |
| 4,259,553 A | * | 3/1981 | Tanaka et al. ............ 200/81 R |
| 4,567,916 A | * | 2/1986 | Antal et al. .................. 138/104 |
| 4,805,942 A | * | 2/1989 | Goodridge ............... 285/222.1 |
| 5,129,686 A | * | 7/1992 | Sanders et al. ............. 285/258 |
| 5,413,147 A | * | 5/1995 | Moreiras et al. ............ 138/109 |
| 5,782,270 A | * | 7/1998 | Goett et al. .................. 138/109 |
| 5,813,438 A | | 9/1998 | Reed .......................... 138/121 |

FOREIGN PATENT DOCUMENTS

| DE | 19728383 | 1/1999 |
| EP | 0 779 417 A2 | 6/1997 |
| EP | 0 974 741 A1 | 1/2000 |
| GB | 1 506 776 | 4/1978 |

* cited by examiner

*Primary Examiner*—Patrick Brinson

(57) ABSTRACT

The invention relates to a flexible hose line, in particular, a high-pressure hose line which is subjected to a pressurized forming process, preferably for variable levels of pressure. Said flexible hose line consists of several layers, at least one of which is configured as a reinforcing layer. The hose line is characterised by an inner layer (1) with a profile which can be elastically stressed in at least the longitudinal direction of the hose. Said inner layer is the only layer whose length can be modified. The hose line is also characterized by a reinforcing layer (3) which is configured to absorb the tensile forces acting on the hose in the longitudinal direction, by a compensation zone (2) which is located between the inner layer (1) and the reinforcing layer (3) and which compensates the movement of these two layers in relation to one another and acts as a radial support for the inner layer (1) on the reinforcing layer (3); and by connecting areas (9) for connecting the inner layer (1) to the reinforcing layer (3). Said areas are used to define the variable length of the inner layer (1) as a predetermined utilization length, determined by the length of the reinforcing layer (3) between the connecting areas (9).

20 Claims, 3 Drawing Sheets

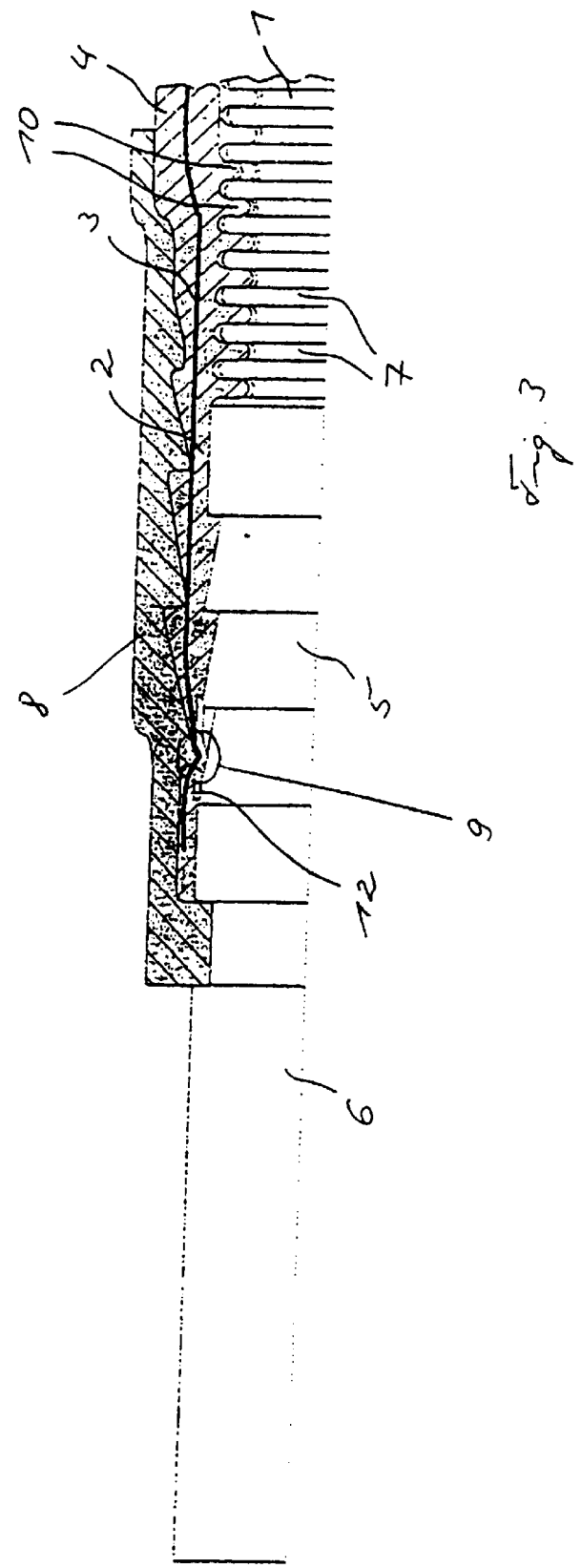

Figure 1:
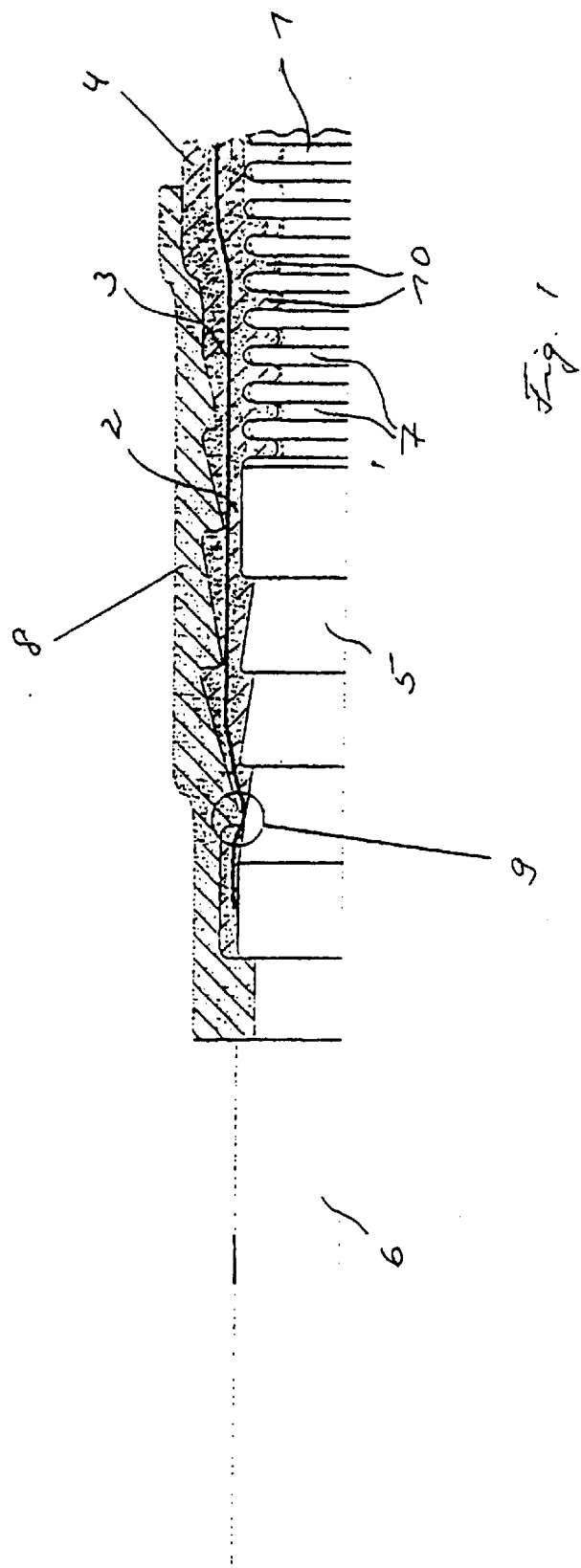

FLEXIBLE HOSE LINE, IN PARTICULAR, HIGH PRESSURE HOSE LINE WHICH IS SUBJECTED TO A PRESSURIZED FORMING PROCESS

The invention pertains to a flexible hose line, in particular, a high-pressure hose line which is subjected to a pressurized forming process, preferably for variable levels of pressure, and a process for manufacturing such hose lines according to the preamble of claims 1 and 12.

A flexible hose line for high-pressure media is known from DE 197 28 383 A1. This flexible hose line comprises an annular or screw-thread shaped corrugated metal hose, it is connected to a tubular connecting element, and it has a protective sleeve made of elastic, pliable material surrounding the outer sides of the hose line and the connecting element. In the region of the terminal corrugations adjacent to the connecting element, the protective sleeve features depressions that are directed radially inwards and that engage the valleys of the corrugations of the metal hose.

With such a solution, the transition region between the metal hose and the connecting element can be designed to accept a load.

The problem of the invention is to develop a hose line that can be exposed to high pressures and, in particular, that can withstand variable levels of pressure over a comparatively long period.

This problem is solved according to the invention by an inner layer that features a profile piece that can be elastically stressed at least in the longitudinal direction of the hose and that is the only layer that can be changed in length, by a reinforcing layer that is designed to absorb tensile forces acting in the longitudinal direction of the hose, by a compensation zone that is arranged between the inner layer and the reinforcing layer and that is used to compensate for relative movement between these layers and to support the inner layer in the radial direction on the reinforcing layer, and by connecting areas between the inner layer and the reinforcing layer, which are used to define the variable length of the inner layer as a predetermined useful length determined by the length of the reinforcing layer between the connecting areas.

The invention is associated with the advantage that a hose line with a large degree of flexibility can be exposed to high levels of pressure, in particular, to variable levels of pressure of large amplitudes. Such a possibility results from the large flexibility of the inner layer which is made less pressure-dependent by the reinforcing layer in connection with the compensation zone.

The application of pressure leads to shape and position changes of the inner layer that are limited by the reinforcing layer. This produces both a force acting against the axial expansion of the inner layer and also simultaneously a reaction force directed radially inwards and transmitted by the compensation zone. In this way, the compensation zone is used for the largely uniform reception and distribution of forces originating from the inner layer.

In a preferred embodiment of the invention, the profile piece of the inner layer is designed to be similar to a corrugated tube. The inner layer can also be a corrugated tube that can change in length for only small material stresses.

In another embodiment of the invention, the inner layer is formed by an element that can be pretensioned elastically in the axial direction and that is a component of the hose line in the pretensioned state. The pretensioning is advantageously chosen such that a certain pretensioning remains even for the largest possible pressure amplitudes in order to keep material fatigue low even for long use and high pulse-switching rates.

For special applications, e.g., the use of the hose line for media with an effect on the environment, the inner layer can be designed to have a high degree of gas impermeability, which is preferably achieved by making the inner layer out of a metallic material.

According to another embodiment of the invention, the reinforcing layer is formed from a mesh, in which the threads of the mesh feature an axial orientation and the preferred mesh angle α, relative to the hose longitudinal axis, does not exceed 50° and is advantageously within the range of 35° to 45°.

In order to distribute the forces originating from the inner layer uniformly into the support body formed by the inner layer, the compensation zone, the reinforcing layer, and the connecting areas, the compensation zone is preferably formed from an elastomer, a thermoplastic elastomer, or a thermoplastic. Another favorable distribution of the forces introduced into the entire system is achieved by sinking the compensation zone into the profile piece of the inner layer or filling up the profile piece with the compensation zone at least in the connecting areas.

A method according to the invention for manufacturing a flexible hose line is realized in that the inner layer and/or the reinforcing layer are provided with a compensation zone bonded to each layer, in that the inner layer and the reinforcing layer are brought into the required position relative to each other through relative movement, and in that the inner layers are connected to the reinforcing layer in the region of the hose line fittings.

In an advantageous execution of the method, the inner layer is pretensioned in the longitudinal direction of the hose line before the inner layer and the reinforcing layer are connected in the region of the hose fittings.

A force-fit and/or positive-fit connection between the inner layer and the reinforcing layer can be produced advantageously through radial forces on the component surrounding the reinforcing layer.

The invention is to be explained in more detail in the following with reference to an embodiment and relevant drawings.

Figure 2:
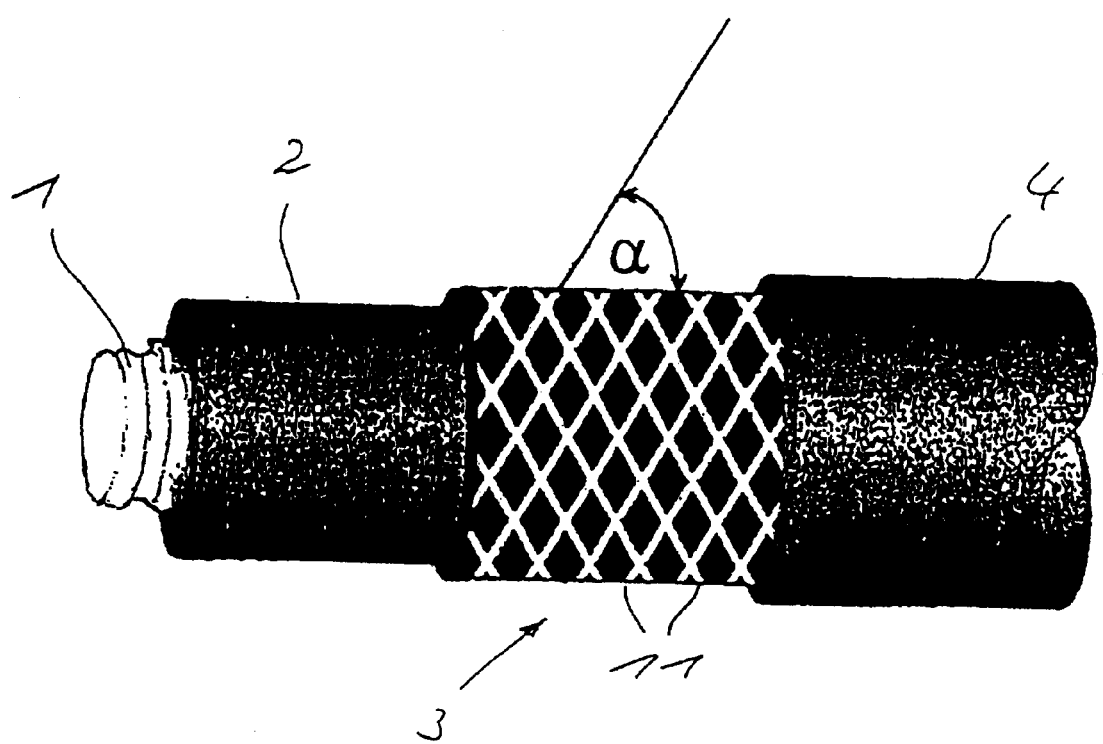

Shown are:

FIG. 1, a hose line region, partially in section,

FIG. 2, a hose line section with exposed reinforcing layer, and

FIG. 3, a hose line region with a connecting area between inner layer and reinforcing layer, which has been modified relative to FIG. 1.

The hose illustrated in FIG. 1 at its end region consists of a metallic inner layer 1, an elastomer compensation zone 2, a reinforcing layer 3 built as a mesh, and an elastomer outer layer 4.

The corrugated tube-like inner layer 1 is rigidly connected at its hose end to a connecting piece 5 that features a sawtooth-like contour on its outer edge and that transitions into a hollow-cylindrical connecting piece 6. The connecting piece 5 and the region 7 of the inner layer 1 adjacent to the connecting piece 5, as well as the radially outwards adjacent sections of the compensation zone 2, the reinforcing layer 3, and the outer layer 4 are surrounded by a holder 8.

Due to the effects of radial forces, the holder 8 is formed such that there is a direct force-fit and/or positive-fit contact between the inner layer 1 and the reinforcing layer 3 on the connecting piece 5, resulting in a connecting area 9 that displaces the compensation zone 2 due to the radial forces.

In addition, this produces a positive fit between the inner layer 1 and the segments 10 of the compensation zone 2 engaging the recesses of the profile piece of the inner layer 1.

The mesh of the reinforcing layer 3 is formed from threads or thread groups 11 that are oriented in the axial direction, as can be seen from FIG. 2, i.e., they can be loaded in the longitudinal direction of the hose and they run at a mesh angle α of preferably 35° to 45°.

As illustrated in FIG. 3, a support ring 12 can be provided in connecting area 9, which can set the radial distance of the reinforcing layer 3 in the connecting area 9. For suitable selection of materials, such a support ring 12 can also increase the positive fit in the connecting area 9, because the mesh of the reinforcing layer 3 is pressed in the radial direction at least partially into the support ring 12 and thus it can be loaded in the axial direction.

For manufacturing the hose line, the corrugated tube-like metallic inner layer 1 and the composite element (formed from compensation zone 2, reinforcing layer 3, and outer layer 4) are brought into position relative to each other, so that the inner layer 1 is surrounded by the composite element. In this way, the holders 8 are arranged in the connecting areas 9 of the inner layer 1 and the reinforcing layer 3, whereby the inner layer 1 is pretensioned in the axial direction and in the pretensioned state, it is connected and thus fixed to the reinforcing layer 3 through radial, and if necessary also through axial, forces on the holders 8.

What is claimed is:

1. A flexible hose line, which is subjected to a pressurized forming process, comprising:
    an inner layer having a profile piece which can be elastically stressed at least in a longitudinal direction of the hose line, said inner layer can be changed in length,
    a connecting piece in communication with the inner layer,
    a reinforcing layer that absorbs tensile forces acting in the longitudinal direction of the hose line,
    a compensation zone arranged between the inner layer and the reinforcing layer, said compensation zone compensates for relative movement of the inner layer and the reinforcing layer and supports the inner layer in a radial direction on the reinforcing layer, and
    a connecting area between the connecting piece and the reinforcing layer.

2. Flexible hose line according to claim 1, wherein the profile piece of the inner layer is designed like a corrugated tube.

3. Flexible hose line according to claim 1, wherein the inner layer comprises a corrugated tube.

4. Flexible hose line according to claim 1, wherein the inner layer comprises an element that can be pretensioned elastically in the axial direction and that in the pretensioned state is a component of the hose line.

5. Flexible hose line according to claim 1, wherein the inner layer has a high degree of gas impermeability.

6. Flexible hose line according to claim 5, wherein the inner layer comprises a metallic material.

7. Flexible hose line according to claim 1, wherein the reinforcing layer comprises a mesh.

8. Flexible hose line according to claim 7, wherein the mesh has threads, said threads feature an axial orientation and a mesh angle α that does not exceed 50° relative to a longitudinal axis of the hose line.

9. Flexible hose line according to claim 8, wherein the mesh angle α is within the range of 35° and 45° relative to the longitudinal axis of the hose line.

10. Flexible hose line according to claim 1, wherein the compensation zone is formed from an elastomer, a thermoplastic elastomer, or a thermoplastic.

11. Flexible hose line according to claim 1, wherein the compensation zone has a segment engaging a recess formed by the profile piece of the inner layer.

12. Flexible hose line according to claim 1, further comprising:
    an outer layer in communication with the reinforcing layer.

13. Flexible hose line according to claim 12, further comprising:
    a holder surrounding the outer layer.

14. Flexible hose line according to claim 1, wherein the compensation zone is in communication with the connecting piece.

15. Flexible hose line according to claim 1, further comprising:
    a support ring in communication with the reinforcing layer.

16. Flexible hose line according to claim 1, further comprising:
    a hollow-cylindrical connecting piece in communication with the connecting piece.

17. Flexible hose line according to claim 1, wherein the connecting piece has a sawtooth-like contour.

18. A flexible hose line, comprising:
    an inner layer connected at a hose end to a connecting piece, said connecting piece having a sawtooth-like contour;
    a compensation zone in communication with the inner layer and the connecting piece;
    a reinforcing layer in communication with the compensation zone and the connecting piece;
    an outer layer in communication with the reinforcing layer;
    a holder surrounding the inner layer, the connecting piece, the compensation zone, the reinforcing layer, and the outer layer.

19. The flexible hose line according to claim 18, wherein the holder is formed such that there is a direct force-fit and/or positive-fit contact between the inner layer and the reinforcing layer on the connecting piece.

20. The flexible hose line according to claim 18, further comprising:
    a hollow-cylindrical connecting piece in communication with the connecting piece.

* * * * *